(12) United States Patent
Raab et al.

(10) Patent No.: US 7,388,654 B2
(45) Date of Patent: Jun. 17, 2008

(54) RETROREFLECTOR COVERED BY WINDOW

(75) Inventors: Simon Raab, Maitland, FL (US); Lawrence B. Brown, Cochranville, PA (US); Robert E. Bridges, Kennett Square, PA (US)

(73) Assignee: Faro Technologies, Inc., Lake Mary, FL (US)

( * ) Notice: Subject to any disclaimer, the term of this patent is extended or adjusted under 35 U.S.C. 154(b) by 344 days.

(21) Appl. No.: 11/060,244

(22) Filed: Feb. 17, 2005

(65) Prior Publication Data

US 2005/0185182 A1 Aug. 25, 2005

Related U.S. Application Data

(60) Provisional application No. 60/547,311, filed on Feb. 24, 2004.

(51) Int. Cl.
*G01C 3/08* (2006.01)
(52) U.S. Cl. ............... 356/4.01; 356/152.2; 356/152.3
(58) Field of Classification Search ............... 356/625, 356/628, 634, 152.2, 152.3; 250/559.49
See application file for complete search history.

(56) References Cited

U.S. PATENT DOCUMENTS

| 5,327,216 A | 7/1994 | Berni |
| 5,355,241 A | 10/1994 | Kelley |
| 2003/0020895 A1* | 1/2003 | Bridges ............... 356/4.01 |

OTHER PUBLICATIONS

PCT Search Report—PCT/US2005/005058.
PCT Search Report - PCT/US2005/005058.

* cited by examiner

*Primary Examiner*—Gregory J. Toatley, Jr.
*Assistant Examiner*—Abdullahi Nur
(74) *Attorney, Agent, or Firm*—Cantor Colburn LLP

(57) ABSTRACT

Embodiments may comprise methods, apparatuses, systems, and one or more computer-readable media having computer-readable instructions thereon for adjusting a laser retroreflector to compensate for passing laser light through a window of the retroreflector comprising: determining an adjustment factor to compensate for propagation errors due to passing laser light through the window of the retroreflector; and adjusting a location of a reflection point of the retroreflector to minimize the propagation errors based on the adjustment factor.

5 Claims, 6 Drawing Sheets

(a)          (b)

US 7,388,654 B2

RETROREFLECTOR COVERED BY WINDOW

CROSS REFERENCE TO RELATED APPLICATIONS

This application claims the benefit of U.S. provisional patent application Ser. No. 60/547,311 filed Feb. 24, 2004, the entire contents of which are incorporated herein by reference.

BACKGROUND OF THE INVENTION

1. Field of the Invention

The present disclosure relates to retroreflector targets which may be used in coordinate metrology for example.

2. Discussion of the Related Art

There is a type of instrument that measures the coordinates of a point by sending a laser beam to a retroreflector target that is in contact with the point. The instrument determines the coordinates of the point by measuring the distance and the two angles to the retroreflector target. A popular type of retroreflector target comprises a cube-corner retroreflector embedded in a metal sphere, with the apex of the cube corner placed at the center of the sphere. This type of retroreflector target is commonly called a spherically mounted retroreflector (SMR). Cube-corner retroreflectors are formed of three mutually perpendicular faces. These faces may be constructed of three perpendicular mirrors (an open cube corner) or of three perpendicular surfaces of a glass prism (a solid cube corner).

SUMMARY OF THE INVENTION

An embodiment may comprise a method for adjusting a laser retroreflector to compensate for passing laser light through a window of the retroreflector comprising: determining an adjustment factor to compensate for propagation errors due to passing laser light through the window of the retroreflector; and adjusting a location of a reflection point of the retroreflector to minimize the propagation errors based on the adjustment factor.

An embodiment may comprise a laser retroflector apparatus comprising: a window for passing laser light to the retroreflector; a reflection point located on the retroreflector for reflecting the laser light after the laser light has passed through the window wherein the reflection point is located at a selected location to minimize propagation errors of the laser light due to the laser light passing through the window.

An embodiment may comprise a system for adjusting a laser retroreflector to compensate for passing laser light through a window of the retroreflector comprising means for determining an adjustment factor to compensate for propagation errors due to passing laser light through the window of the retroreflector; and means for adjusting a location of a reflection point of the retroreflector to minimize the propagation errors based on the adjustment factor.

An embodiment may comprise a one or more computer-readable media having computer-readable instructions thereon which, when executed by a computer, cause the computer to determine an adjustment factor to compensate for propagation errors due to passing laser light through a window of a retroreflector; and determine a location of a reflection point of the retroreflector to minimize the propagation errors based on the adjustment factor.

BRIEF DESCRIPTION OF THE FIGURES

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

The exemplary embodiment may be implemented as any type of open cube-corner retroreflector, of which the spherically mounted retroreflector (SMR) is one example. In many factory environments where metrology measurements are made, large amounts of particulate matter are thrown into the air as a result of machining or other work activities. This matter can coat the glass surfaces of the cube corner or collect in the edges between the glass surfaces. When sufficient material builds up, the laser light beam incident on the retroreflector may reflect with diminished power or with a distorted wave front. The glass surfaces of the cube-corner can be cleaned. However, if the cleaning is done improperly, the glass surfaces may be scratched. In some cases, it may be difficult to clean the matter that accumulates in the vertex where adjacent glass panels meet. The present disclosure reduces these difficulties by placing a flat glass window over the retroreflector. The flat window can be cleaned quickly with a minimum of effort and is readily replaceable if damaged. This increases the likelihood that the retroreflector can be kept clean and thereby reduces the likelihood of a measurement error caused by a dirty retroreflector.

There are some potential problems that may result from placing a glass window over a cube-corner retroreflector. However, these errors can be minimized with proper design of the retroreflector assembly. These design techniques are discussed below.

Figure 1:
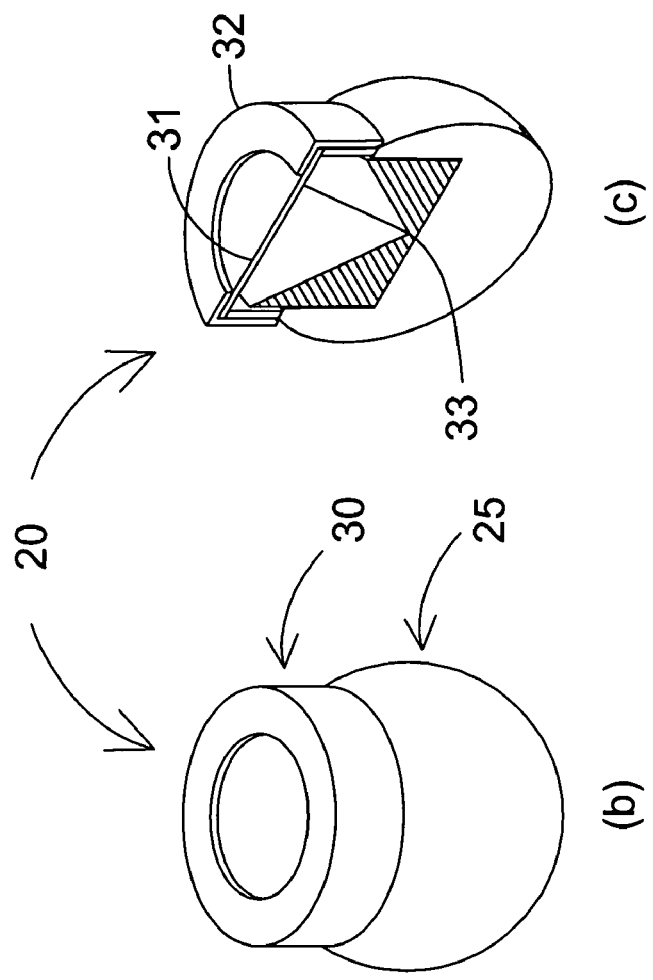
FIG. 1(a) is a prior art retroreflector.
FIG. 1(b) is a perspective view of an embodiment of a retroreflector.
FIG. 1(c) is a cut away view of the retroreflector of FIG. 1(b).
Figure 1:
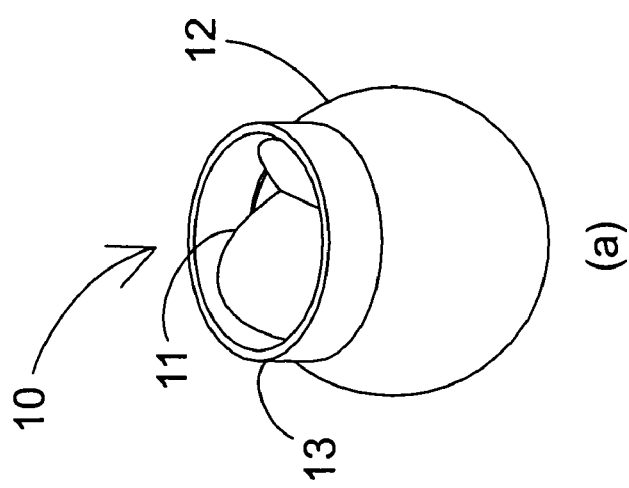

FIG. 1(a) shows a perspective view of the traditional SMR 10. It comprises the open cube-corner retroreflector 11, sphere 12, and lip 13. The point where the three perpendicular mirror surfaces intersect is referred to as the apex 33 of the cube-corner. In the traditional SMR 10, the apex 33 is placed as nearly as possible at the center of the sphere 12. The lip 13 provides protection for the cube-corner retroreflector 11. It also provides a convenient handhold for the operator.

The protected SMR is shown in FIG. 1(b) in perspective view and in FIG. 1(c) in sectional view. It comprises the modified SMR body 25 and the protective cover 30. The modified SMR body 25 comprises the open cube-corner retroreflector 11, sphere 12, and lip 13 as in the traditional SMR 10. However, in the modified SMR body, the apex 33 of the cube corner is shifted away from the center of the sphere for reasons that are explained below. The protective cover 30 comprises the window 31 and the window holder 32.

Figure 2:
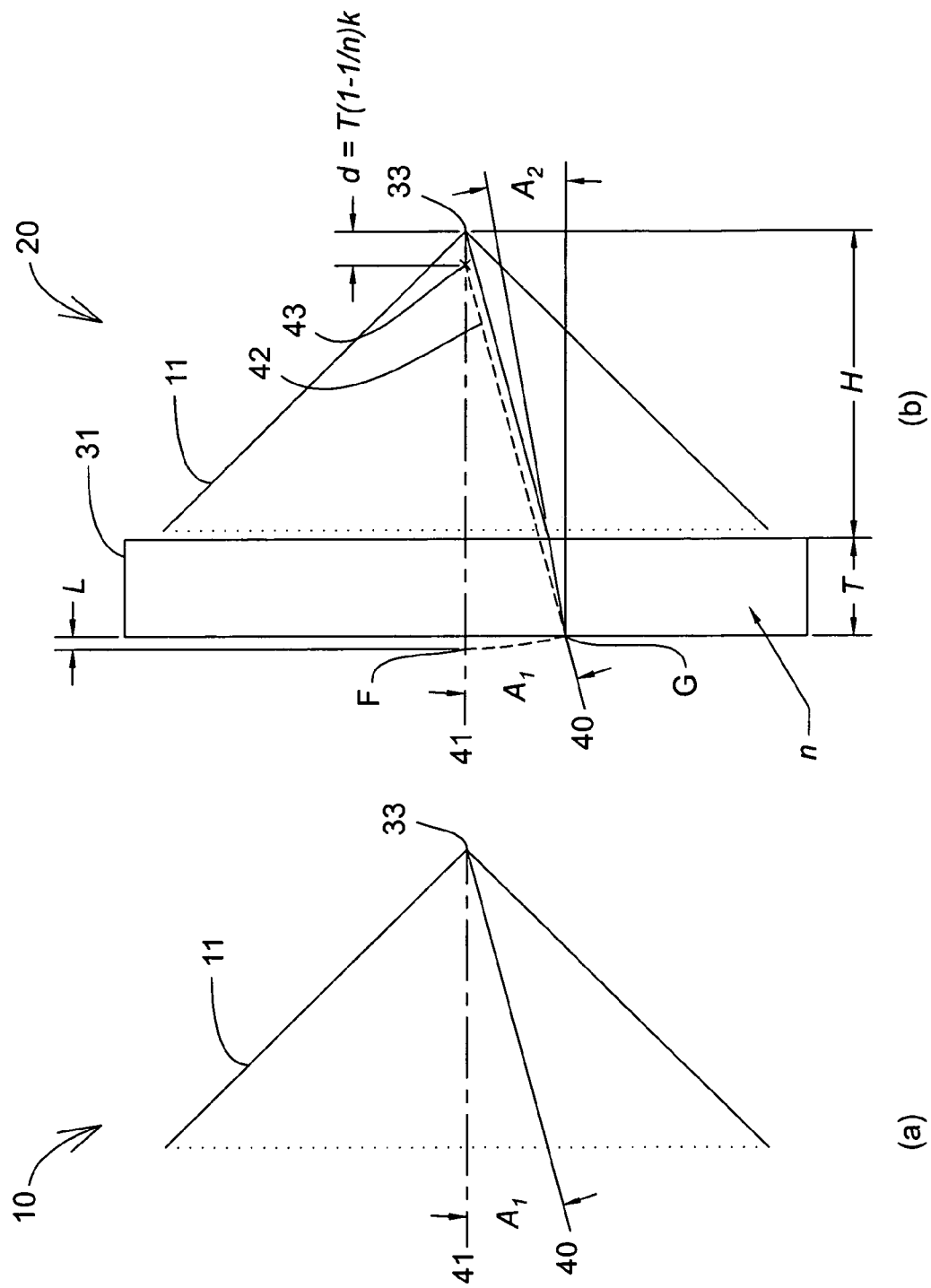
FIG. 2(a) is diagram of a retroreflector.
FIG. 2(b) is a diagram of a retroreflector having a window.

FIG. 2(a) shows a schematic representation of the open cube-corner retroreflector 11 that is a part of the traditional SMR 10. The incoming laser beam 40 enters the open cube-corner retroreflector 11 at an angle $A_1$ with respect to the axis of symmetry 41. It strikes the apex 33 of the cube corner, reflects off the three perpendicular mirrors of the cube corner, and retraces the beam path back out of the retroreflector.

FIG. 2(b) shows the schematic representation of the open cube-corner retroreflector 11 and the window 31 that are a part of the protected SMR 20. The thickness T of the window is exaggerated in the figure to show the bending of the light within the glass more clearly. Laser beam 40 enters the window 31 at an angle $A_1$ with respect to the axis of symmetry 41. When the laser beam 40 enters the window 31, it bends inward toward the normal of the window surface. When it has passed through the window and reaches the air, it bends outward away from the normal, back to the original angle $A_1$. The path 42 that the laser light would have taken if the window were not present is indicated as a dashed line. When the window 31 is present, the path 40 of the laser beam with the window does not coincide with the path 42 of the laser beam without the window.

The intersection 43 of the axis of symmetry 41 with the path 42 is marked with an "X." This point should be kept near at the center of the sphere. This ensures that the tracker measures the same point in space regardless of the orientation of the SMR (i.e., the angle $A_1$). To get the best performance, the apex 33 of the cube corner should be adjusted away from the sphere center, as shown in FIG. 2(b). If the angle $A_1$ is small, then to a good approximation $d=T(1-1/n)$, where T is the thickness of the window and n is the index of refraction of the window.

The optimal design for the protected SMR 20 is achieved by adjusting the cube-corner 11 within the sphere 12 to minimize the errors in measured radial and transverse distances. Radial distance is measured along the radial direction, which is the direction from the measurement instrument to the SMR. Transverse distance is measured along a plane that is located at the SMR and is perpendicular to the radial direction. The radial error $\Delta R$ for the protected SMR is $$\Delta R = 2[nT/\cos(A_2) + H/\cos(A_1) - (nT+H+L)]. \quad (1)$$

The distance L is shown in FIG. 2(b). To find L, draw an arc from point 43 to point G where the laser beam 40 intersects window 31. Find point F where the arc intersects the normal line 41. The distance from point F to the window is $$L = (T+H-d)/\cos(A_1) - (T+H-d). \quad (2)$$

The optical path length from apex 33 to point F is $nT+H+L$, which is the final term in equation 1. The round trip optical path length is twice this amount, which accounts for the factor of 2 at the front of equation 1. The optical path length from apex 33 to point G is $nT/\cos(A_2)+H/\cos(A_1)$. These terms are also found in equation 1. If the window 31 caused no error in the radial measurement, the optical path length from point 33 to G would be the same as from point 33 to F, and the radial error $\Delta R$ in equation 1 would be zero. By selecting the depth d of the apex 33 in relation to the sphere center, the distance L and the corresponding error $\Delta R$ in equation 1 can be made to vary. By proper selection of the distance d, the error $\Delta R$ can be minimized.

The transverse error $\Delta D$ for the protected SMR is $$\Delta D = T\sin(A_1-A_2)/\cos(A_2) - d\sin(A_1). \quad (3)$$

The first term in equation (3) represents the bending of the laser beam 40 by the glass window 31 away from the axis of symmetry 41. The second term represents travel toward the axis of symmetry 41 as a result of the laser beam traveling past point 43 and on to point 33. The second term in equation (3) tends to cancel the first term. By proper selection of the distance d, the size of the second term can be adjusted to minimize the error $\Delta D$.

For a given angle $A_1$, a particular value of d minimizes radial error and a different value minimizes transverse error. The optimum depth d also changes with the angle $A_1$. A graphical approach is helpful in selecting the optimum depth d over a range of angles. For example, suppose that a protected SMR has the following characteristics: T=1 mm, H=21 mm, n=1.5. The clear aperture of the window holder 32 determines the range of possible angles $A_1$. In this example, assume that $A_1$ can vary from 0 and 25 degrees (i.e., a full angle of 50 degrees). By using equations (1), (2), and (3) and Snell's law, $\sin(A_1)=n\sin(A_2)$, the radial and transverse errors can be found as a function of angle $A_1$ for different depths d. The depth d is conveniently given in terms of the adjustment factor k:

$$d = T(1-1/n)k. \quad (4)$$

The optimum adjustment factor k is close to 1 for small angles and is larger for larger angles.

Figure 3:
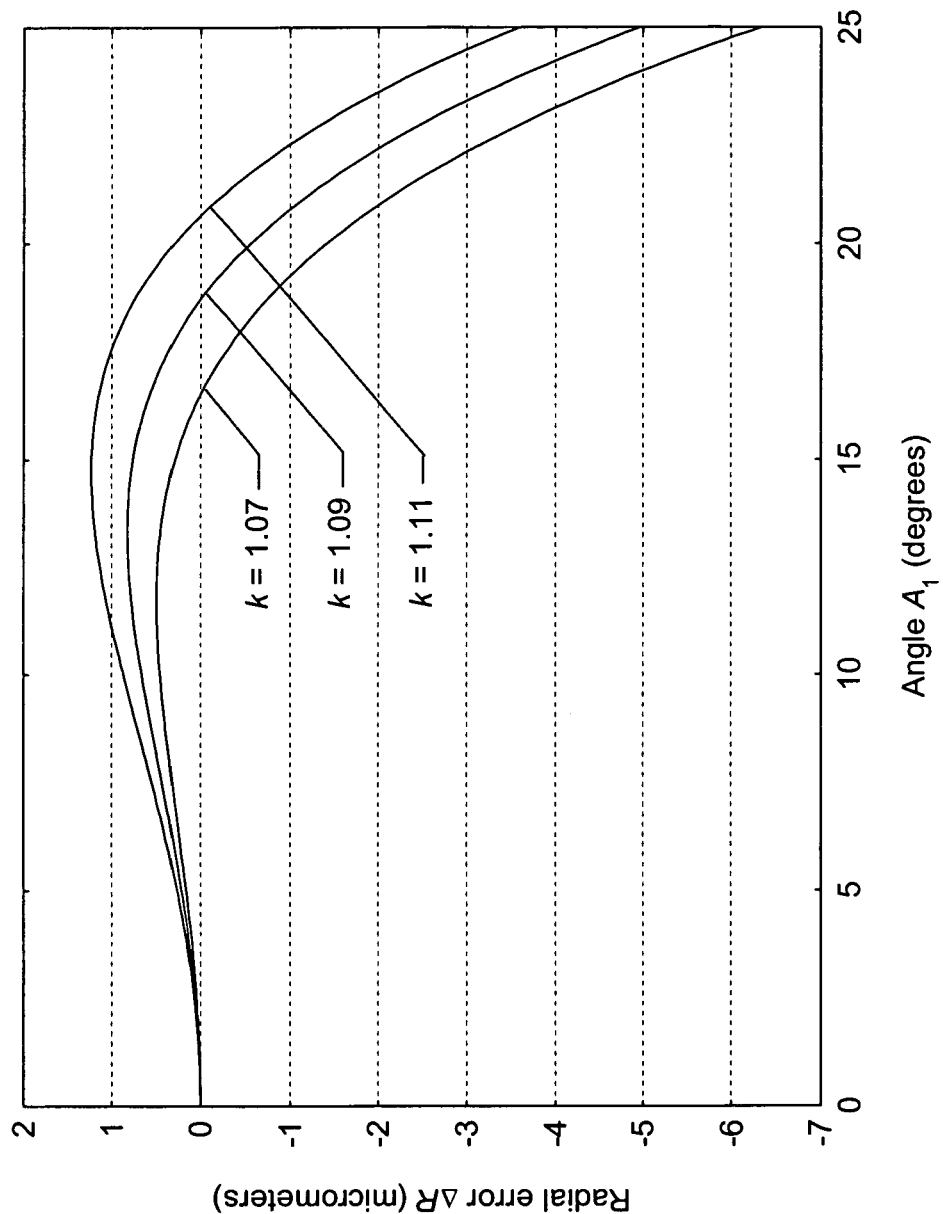
FIG. 3 is graph of radial error verses angle $A_1$.
Figure 4:
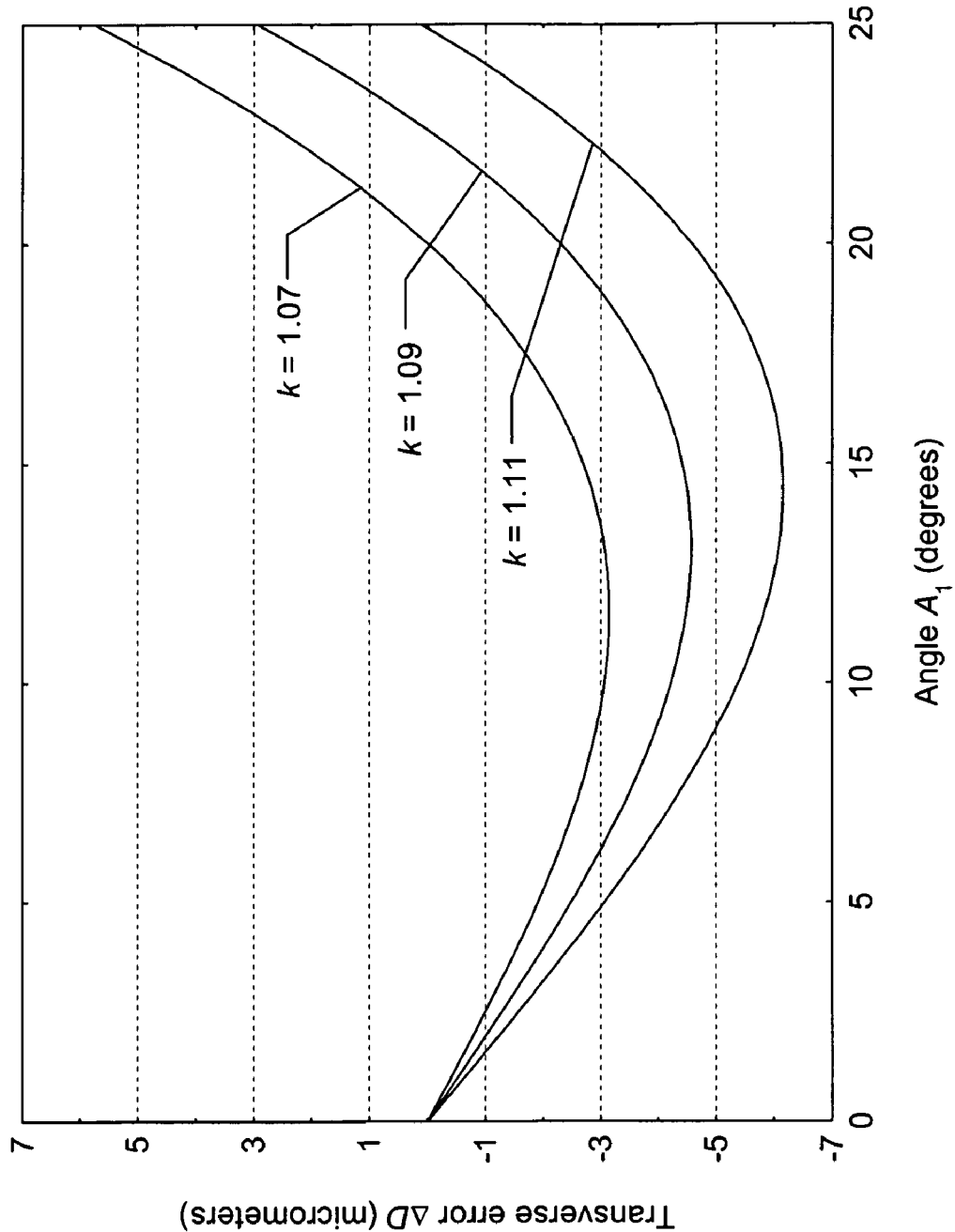
FIG. 4 is graph of transverse error verses angle $A_1$.

FIGS. 3 and 4 show the results for the radial and transverse errors, respectively. From the graphs, it can be seen that k=1.09 gives a maximum radial and transverse error of less than 5 micrometers. This is close to the optimum value since it gives a smaller maximum error than either k=1.07 or k=1.11. The corresponding depth d is found from equation (4) to be 0.363 millimeter.

In another preferred embodiment, T=1 mm, n=1.51509, k=1.0908, and d=0.3708 mm.

Figure 5:
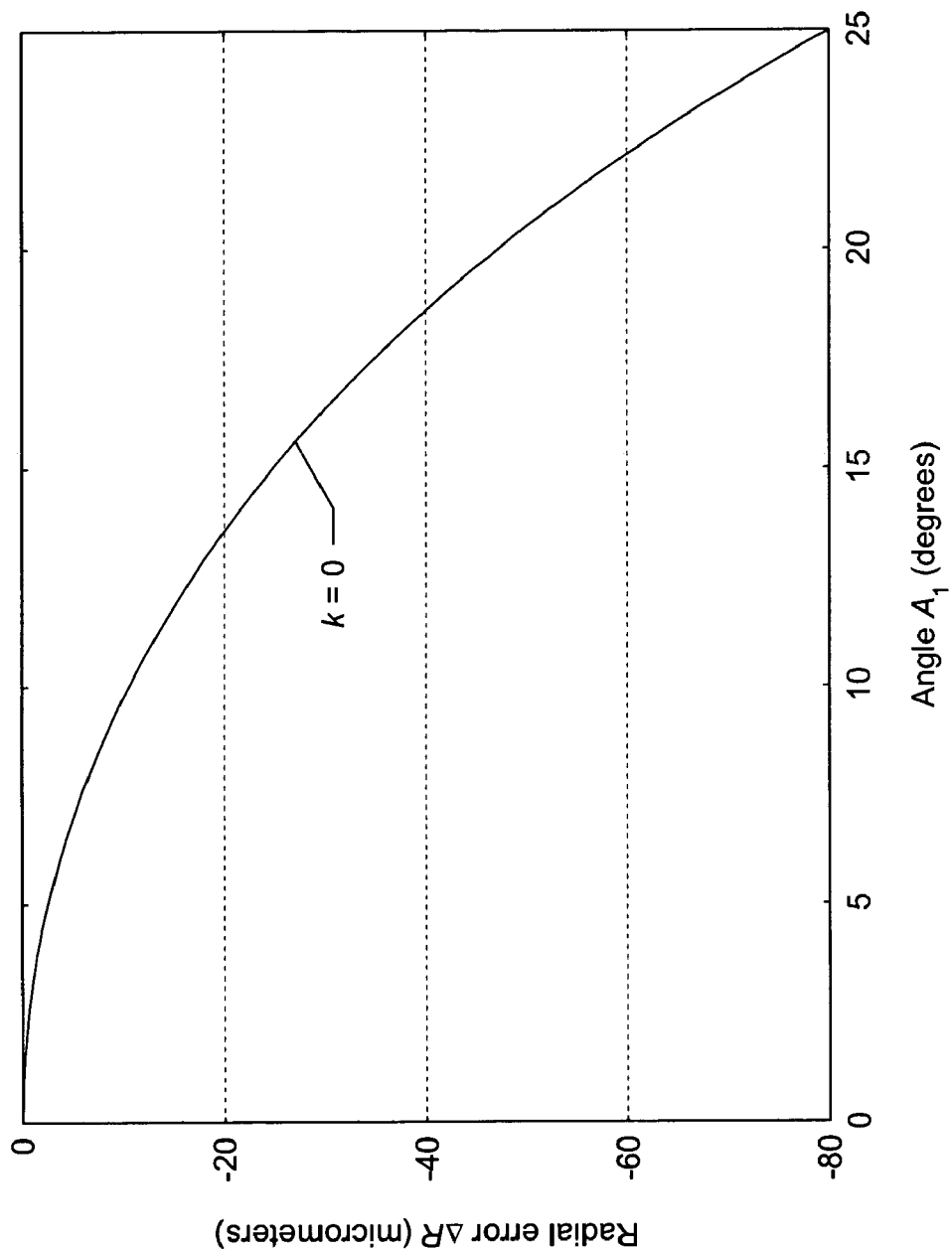
FIG. 5 is graph of radial error verses angle $A_1$.
Figure 6:
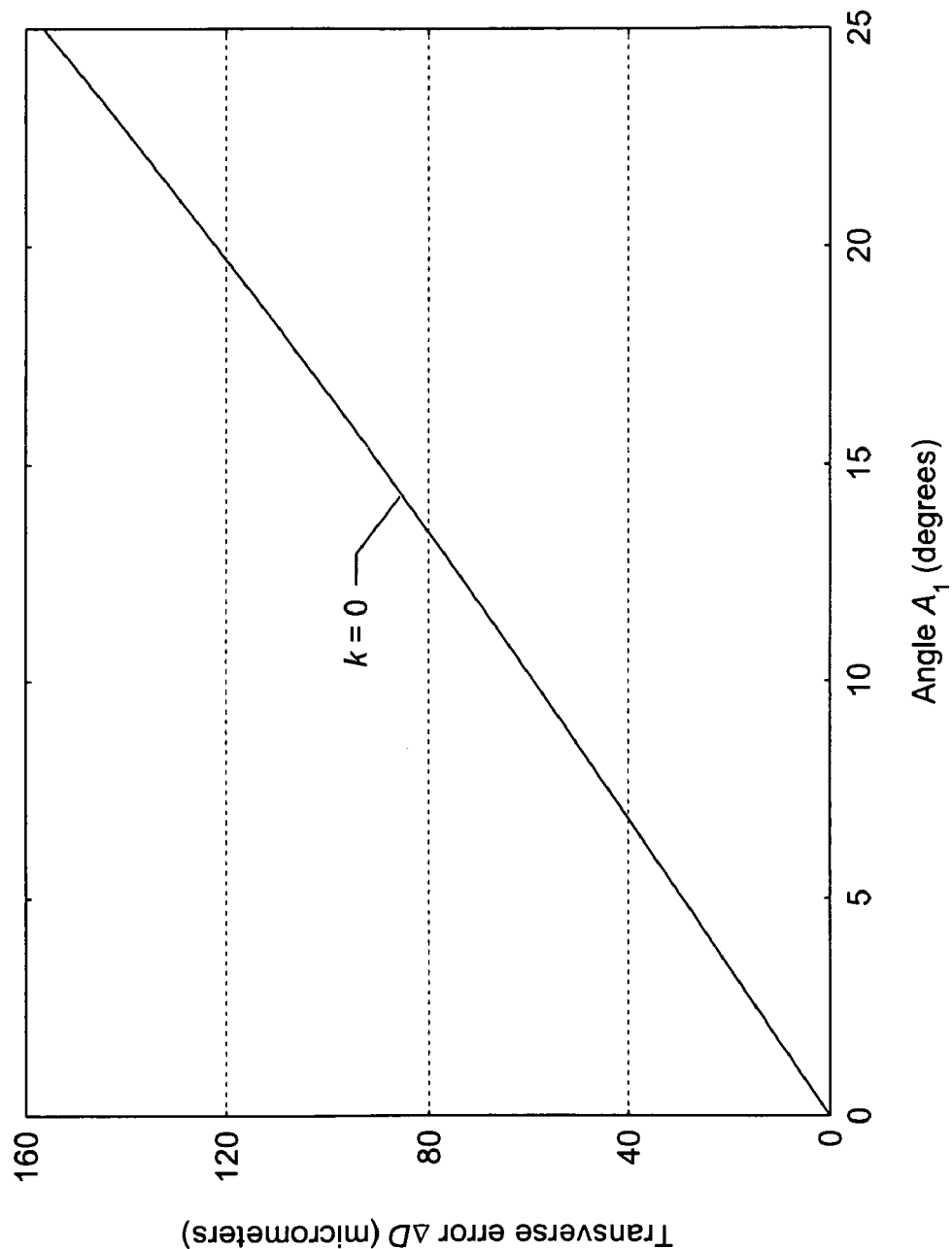
FIG. 6 is graph of transverse error verses angle $A_1$.

The improvement in the radial and transverse accuracy is shown in FIGS. 5 and 6. For these figures, the apex 33 is at the center of the sphere 12 as in the traditional SMR 10. This is the case k=0. FIGS. 5 and 6 show the maximum radial and transverse errors to be approximately 80 and 155 micrometers, respectively. By optimizing the depth d of the apex 33, the maximum errors have been reduced by more than an order of magnitude.

The capabilities of the present invention may be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

It will be apparent to those skilled in the art that various modifications and variations can be made to the cube-corner retroreflector covered by window without departing from the spirit or scope of the invention.

The invention claimed is:

1. A method for adjusting the depth of a cube-corner reflector apex location within a spherically mounted retroreflector (SMR) to partially compensate for radial and transverse errors caused by passing a laser light-beam through a window of the SMR comprising:

selecting a number of values of depth d to be evaluated, where depth d is defined as a distance from a center of the SMR to the cube-corner apex;

a selecting a range of angles of incidence $A_1$ of the laser beam on the window;

calculating, for each value d, a radial error $\Delta R$ and a transverse error $\Delta D$ resulting from the window as a function of the angle of incidence $A_1$ over the selected range of angles of incidence;

selecting a value of depth d that provides a smallest absolute value of errors for both the radial error $\Delta R$ and the transverse error based on results of the calculation; and adjusting the depth of the cube-corner apex within the spherically mounted retroreflector (SMR) to the selected value of d.

2. The method of claim 1 wherein the calculation of the radial error $\Delta R$ for a particular depth d and a particular angle of incidence $A_1$ further comprises:

starting with a first equation $\Delta R=2[nT/\cos(A_2)+H/\cos(A_1)-(nT+H+L)]$ where T is a thickness of the window, n is an index of refraction of the window; and H is a distance from an inside edge of the window to the cube-corner apex;

eliminating L from the first equation by substituting a second equation $L=(T+H-d)/\cos(A_q)-(T+H-d)$;

eliminating the quantity $A_2$ from the combination of the first and second equations using third equation $\sin(A_2)=\sin(A_1)/n$ to obtain a resulting equation for $\Delta R$ in which the quantity H cancels out; and substituting values for T, n, $A_1$ and d into the resulting equation to obtain a value for $\Delta$.

3. The method of claim 1 wherein the calculation of the transverse error $\Delta D$ for a particular depth d and a particular angle of incidence $A_2$ further comprises:

starting with a first equation $\Delta D=T \sin(A_1-A_2)/\cos(A_2)-d \sin(A_1)$;

eliminating the quantity $A_2$ from the first equation by substituting a second equation $\sin(A_2)=\sin(A_1)/n$ to obtain a resulting equation for $\Delta D$; and substituting values for T, n, $A_1$ and d into the resulting equation to obtain a value for $\Delta D$;

where T is a thickness of the window, and n is an index of refraction of the window.

4. The method of claim 1 wherein the depth d is set equal to $T(1-1/n)k$, where k is an adjustable parameter between 1.0 and 1.2; and where T is a thickness of the window, and n is an index of refraction of the window.

5. The method of claim 4 wherein T=1 mm, n=1.51509, k=1.0908, and d=0.3708 mm.

* * * * *